United States Patent [19]

Classon

[11] 4,237,333
[45] Dec. 2, 1980

[54] HIGH VOLTAGE INSULATED CABLE TERMINATIONS

[75] Inventor: Ake Classon, Ludvika, Sweden
[73] Assignee: ASEA Aktiebolag, Vesteras, Sweden
[21] Appl. No.: 937,590
[22] Filed: Aug. 28, 1978
[30] Foreign Application Priority Data
    Sep. 2, 1977 [SE] Sweden ............... 7709880
[51] Int. Cl.³ ............................. H02G 15/24
[52] U.S. Cl. .................. 174/21 R; 174/17 GF; 174/18
[58] Field of Search .......... 174/21 R, 22 R, 17 GF, 174/17 CT, 18

[56] References Cited
U.S. PATENT DOCUMENTS

| | | | |
|---|---|---|---|
| 3,374,331 | 3/1968 | Brockhaus et al. | 174/18 X |
| 3,376,541 | 4/1968 | Link | 174/18 UX |
| 3,622,940 | 11/1971 | Illies | 174/18 UX |
| 4,097,681 | 6/1978 | Spencer | 174/22 R X |

*Primary Examiner*—Roy N. Envall, Jr.
*Attorney, Agent, or Firm*—Watson, Cole, Grindle & Watson

[57] ABSTRACT

A high voltage cable, which is insulated with a solid insulated material, preferably cross-linked polyethylene, is connected to a pressure-gas-insulated conductor by means of a cable termination apparatus comprising a metal enclosure filled with pressure gas. The cable end is provided with a contact socket and secured in the metal enclosure by means of a pull rod fixed to the contact socket and oriented substantially in the axial extension of the cable end. A sealing device encloses a portion of the contact socket and the adjacent portion of the high voltage cable insulation.

15 Claims, 3 Drawing Figures

HIGH VOLTAGE INSULATED CABLE TERMINATIONS

BACKGROUND

1. Field of the Invention

The present invention relates to high voltage insulated cable terminations, and more particularly to such type cable terminations intended to be connected to a pressure-gas-insulated conductor.

2. Prior Art

To obtain a voltage-grading termination on a high-voltage cable with an insulation of cross-linked polyethylene (PEX), there is often used some form of a rubber stress cone with a conductive external coating. The cone reduces the electric field strength around the cable end and keeps the field strength gradient along the cable insulation sufficiently low to avoid partial discharges, and thus the risk of breakdown in the insulating medium which surrounds the cable termination. Normally, at low voltages this insulating medium consists of air, thereby providing simple and inexpensive terminations which are easy to handle.

To obtain reasonable dimensions, PEX cables designed for some twenty or thirty kV and higher operating voltages are generally provided with a fluid-insulated termination in an electrically insulating enclosure of plastic or a ceramic material. Such a construction entails costs for the fluid and its insulating enclosure as well as expansion space for the thermal expansion of the insulating fluid. Because of this fact some of the advantages of the PEX cable construction, such as low weight and flexibility and completely dry insulation, are lost. With the enclosure and its accessories a fluid-insulated termination is also rather bulky, which is a considerable disadvantage when connecting PEX cables to switch gear systems insulated with sulphur hexafluoride $SF_6$ and which require small dimensions.

SUMMARY OF THE INVENTION

The object of the present invention is to achieve a PEX cable termination with relatively small dimensions primarily intended for direct connection to $SF_6$ insulated cable systems. According to the invention, the cable end is mounted in a metal enclosure filled with pressure gas with the cable end fixed to the enclosure by a pull rod. The pull rod is oriented substantially along the axial extension of the cable end and one end of the pull rod is fixed relative to the metal enclosure. The other pull rod end is fixed to a contact socket mounted to the end of the cable conductor.

In a cable termination according to the invention the gas in the $SF_6$ insulated cable system is utilized as an insulating medium, which has been made possible by the introduction of special support and sealing devices supplementing the normal termination components which are generally used for existing fluid-insulated type components available on the market. Such a simplified construction affords smaller dimensions at a lower price.

In a construction according to the invention the cable is terminated in the normal manner by an insulating stress cone and a support winding with an electrically conducting tape. The stress cone, along with the tape is effectively supported from outside by means of a special support device; and the cable end is fixed by a pull rod inside a gas-filled enclosure. The high-pressure gas of the switchgear also surrounds the cable termination which results in small dimensions thereof.

The support devices prevent both the stress cone and the cable from being deformed as well as from being pushed out of the enclosure by the gas pressure. The absence of a fluid permits the cable termination to be mounted in an optimum position.

BRIEF DESCRIPTION OF THE FIGURES

The invention is described in greater detail with reference to the embodiments shown in the accompanying drawings wherein.

DETAILED DESCRIPTION

Figure 1:
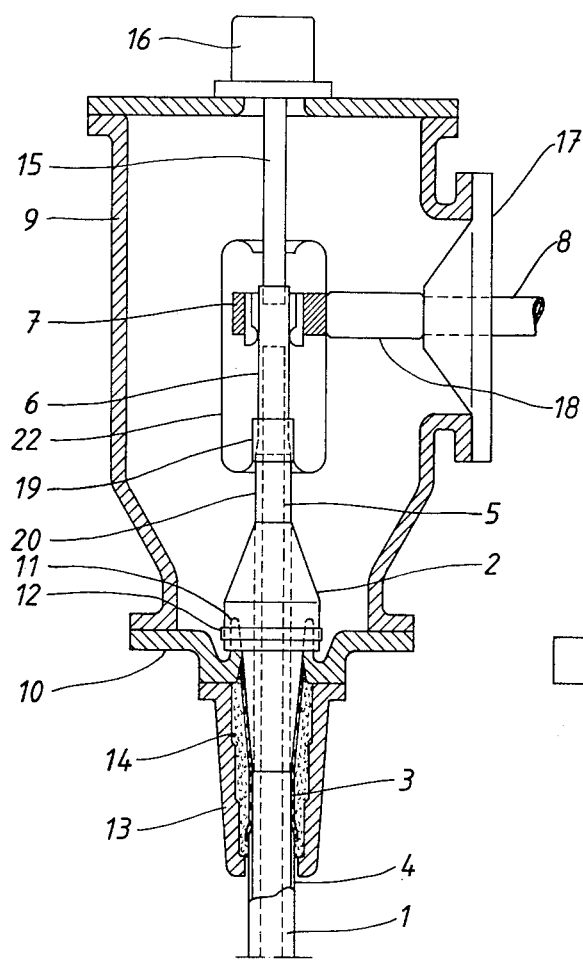
FIG. 1 shows an axial section of a first embodiment of a cable termination.

PEX cable 1 is terminated with rubber stress cone 2, the outer point of which is coated in the normal manner with an electrically conducting material 3, which is also extended along cable 1 so that coating 3 is connected with external screen 4 of the cable.

Cable conductor 5 is terminated with gas-tight socket contact 6 which connects cable conductor 5 to pressure-gas-insulated conductor 8 in the $SF_6$-insulated switchgear via annular sliding contact 7.

The enclosed end of cable conductor 5 is surrounded by, and insulated with, $SF_6$ gas in grounded metal enclosure 9. Metal flange 10 forms a detachable lid on enclosure 9 and is also provided with upturned flanged portion 11 which permits stress cone 2 to be fixed gas-tightly by clamping device 12.

Since the gas pressure in the $SF_6$-insulated switchgear is usually around 0.3 to 0.5 MPa, both cable 1 and stress cone 2 are subjected to considerable forces which continuously tend to push out cable 1 through elastic rubber stress cone 2, and simultaneously force it out through the opening in flange 10. Flange 10 is therefore provided with extending sleeve 13 which completely surrounds the outer portion of stress cone 2 and the conducting coating material 3. Since sleeve 13 is completely filled with a hard material, such as e.g. epoxy resin 14, stress cone 2 is rigidly supported, which prevents stress cone 2 from being deformed by the gas pressure, and thereby jeopardizes the electric voltage strength in the critical joint between conducting screen coatings 3 and 4, respectively, of stress cone 2 and cable 1.

In the embodiment shown in FIG. 1 the force on cable 1 exerted by the gas pressure is also taken up by insulating support 15 which is fixed to $SF_6$-insulated enclosure 9 by screw device 16 in such a manner that both the connection of cable 1 to rubber stress cone 2 and pressure-gas-insulated conductor 8 along with its attachment, if any, to insulating support 17 are completely relieved from mechanical stress. The device also permits removable connection 18 of pressure-gas-insulated conductor 8 to be temporarily removed so that the cable is electrically separated from the remainder of the $SF_6$-insulated switchgear to enable, for example, voltage testing to be undertaken.

Contact socket 6 is joined to cable conductor 5 by welding, pressing or other similar technique, in such a manner that one end of socket 6 is gas-tight. At the other end of socket 6 the gas is prevented from leaking out via cable conductor 5 (which generally consists of a non-gas-tight wire with a plurality of strands) by a sealing device. The sealing device consists of PEX sleeve 19 which, through a shrinkage process, is applied over the joint between contact socket 6 and PEX cable insulation 20. During heating in connection with the shrinking process it is possible to achieve a gas-tight connection between sealing sleeve 19 and cable insulation 20 by conventional measures.

Figure 2:
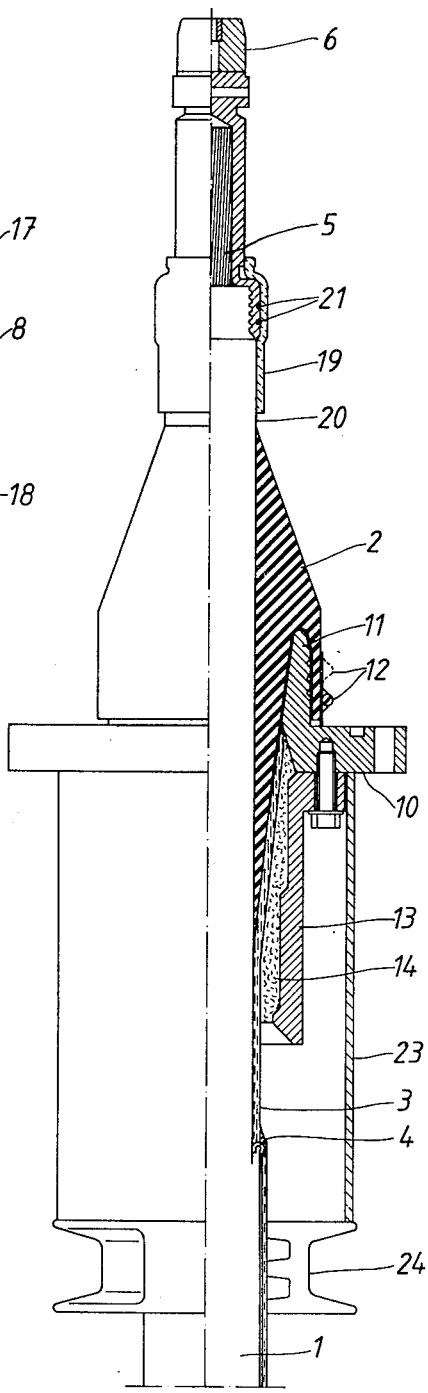
FIG. 2 shows details of the cable termination of FIG. 1 on an enlarged scale.

With respect to FIG. 2, two sealing rings 21 are arranged between sealing sleeve 19 and contact socket 6. Sealing rings 21 have the same, or practically the same, diameter as that part of PEX insulation 20 which is surrounded by pressure gas. This prevents PEX insulation 20 from being subjected to axial forces from the gas pressure which could otherwise displace the insulation along cable conductor 5 through the phenomena of plastic deformation. Additional security against cable insulation 20 being displaced relative to cable conductor 5 is obtained by providing contact socket 6 and the end portion of cable insulation 20 with threads and screwing cable insulation 20 and cable conductor 5 together.

The cable end with its associated terminating parts is surrounded by electrically conducting screen 22 with well rounded corners as is known to those skilled in the art. As shown in FIG. 2, cable suspension device 23 with cable clamp 24 is further arranged close to the cable termination.

Figure 3:
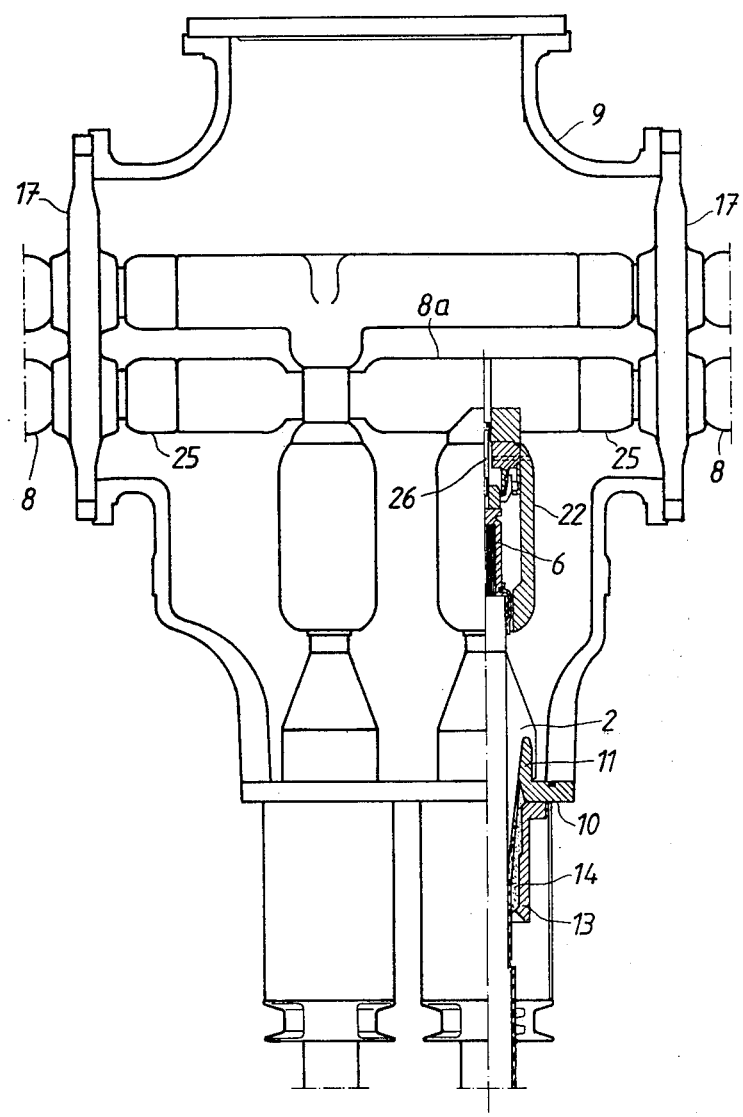
FIG. 3 shows a second embodiment of a cable termination.

FIG. 3 shows another embodiment wherein the cable terminations are connected to three-phase enclosed pressure-gas-insulated conductors 8, which are fixed in metal enclosure 9 by insulators 17. In this embodiment, the cable end is attached to connecting conductor 8a oriented perpendicularly to the longitudinal direction of the cable end, and which connects together phase conductor sections 8 on either side of the cable termination point by sliding contact device 25. The attachment of contact socket 6 of the cable end to connecting conductor 8a is obtained by the aid of threaded bolt 26, which is preferably made of a metallic material. The cable end is surrounded by metallic screen 22 suspended from conductor 8a.

Stress cone 2 need not necessarily be made of rubber, but can also be made of cross-linked polyethylene, like the cable insulation, or a similar relatively hard material. In this way support sleeve 13 with the embedment 14 and upturned flange portion 11 of flange 10 can be omitted.

I claim:

1. Cable termination apparatus for connecting at least one high voltage cable to at least one pressure-gas-insulated conductor, comprising:
   a cable conductor surrounded by a cable insulation of solid insulating material;
   a metal enclosure filled with pressure gas and receiving an end of said cable conductor;
   a contact socket fixed to the end of said cable conductor for interconnecting the high voltage cable and the pressure-gas-insulated conductor;
   a pull rod oriented substantially along the axial extension of said end of the high voltage cable, one end of said pull rod being fixed in relation to said metal enclosure, the other end of said pull rod being fixed to said contact socket.

2. Cable termination apparatus according to claim 1, further comprising a screw device for axially adjusting said pull rod and wherein said pull rod is made of insulating material, said one end thereof being fixed to said metal enclosure by means of said screw device.

3. Cable termination apparatus according to claim 1, further comprising insulating supports mounted to said enclosure for supporting the gas-insulated conductor, and wherein said one end of the pull rod is attached to the gas-insulated conductor.

4. Cable termination apparatus according to any of claims 1, 2 or 3, further comprising an insulating sealing sleeve enclosing a portion of the contact socket and the adjacent portion of the high voltage cable insulation.

5. Cable termination apparatus according to any of claims 1, 2 or 3, further comprising an insulated sealing sleeve enclosing a portion of the contact socket and the adjacent portion of the high voltage cable insulation, at least one sealing ring arranged between said sealing sleeve and said contact socket, the diameter of said sealing ring being substantially the same as the outer diameter of the high voltage cable insulation.

6. Cable termination apparatus according to any of claims 1 to 3, further comprising an insulated sealing sleeve enclosing a portion of the contact socket and the adjacent portion of the high voltage cable insulation, at least one sealing ring arranged between said sealing sleeve and said contact socket, the diameter of said sealing ring being substantially the same as the outer diameter of the high voltage cable insulation, threaded joint means for attaching said contact socket to the high voltage cable insulation.

7. Cable termination apparatus according to any of claims 1 to 3 further comprising a flange mounted on said enclosure, and a stress-relieving cone mounted within said flange, and said high voltage cable is secured in said metal enclosure by said stress-relieving cone.

8. Cable termination apparatus according to any of claims 1 to 3 further comprising a flange mounted on said enclosure, and a stress-relieving cone mounted within said flange, and said high voltage cable is secured in said metal enclosure by said stress-relieving cone, and wherein said stress-relieving cone includes a slot and said flange includes an upturned portion engaged within said slot.

9. Cable termination apparatus according to any of claims 1 to 3, further comprising a flange mounted on said enclosure, and a stress-relieving cone mounted within said flange, and said high voltage cable is secured in said metal enclosure by said stress-relieving cone, a clamp device for fixing said cone gas-tightly to said flange, and wherein said stress-relieving cone includes a slot and said flange includes an upturned portion engaged within said slot.

10. Cable termination apparatus according to any of claims 1 to 3 further comprising a sliding contact and wherein said pressure gas-insulated conductor is disposed transverse to the high voltage cable, and is connected to said contact socket by said sliding contact.

11. Cable termination apparatus according to any of claims 1 to 3, further comprising a sliding contact and wherein said pressure gas-insulated conductor is disposed transverse to the high voltage cable and is connected to said contact socket by said sliding contact, a removable interconnection member mounted in said enclosure, thereby enabling said pressure gas-insulated conductor to be temporarily separated from said cable.

12. Cable termination apparatus according to any of claims 1-3, further comprising a flange mounted on said enclosure and a stress-relieving cone mounted within said flange, and wherein said high voltage cable is secured in said metal enclosure by said stress-relieving cone, said stress-relieving cone including a slot and said flange including an upturned portion engaged within said slot, said flange further including an extending metallic sleeve surrounding the outer portion of said stress-relieving cone.

13. Cable termination apparatus according to any of claims 1-3, further comprising a flange mounted on said enclosure, a stress-relieving cone mounted within said flange, a clamp device for fixing said cone gas-tightly to said flange, and wherein said high voltage cable is secured in said metal enclosure by said stress-relieving cone, said flange further including an extending metallic sleeve surrounding the outer portion of said stress-relieving cone.

14. Cable termination apparatus according to any of claims 1-3, further comprising a flange mounted on said enclosure and a stress-relieving cone mounted within said flange, and wherein said high voltage cable is secured in said metal enclosure by said stress-relieving cone, said stress-relieving cone including a slot and said flange including an upturned portion engaged within said slot, said flange further including an extending metallic sleeve surrounding the outer portion of said stress-relieving cone, an annular space formed between said metal sleeve and said stress-relieving cone, and further comprising an embedding material filling said annular space.

15. Cable termination apparatus according to any of claims 1-3, further comprising a flange mounted on said enclosure, a stress-relieving cone mounted within said flange and a clamp device for fixing said cone gas-tightly to said flange and wherein said high voltage cable is secured in said metal enclosure by said stress-relieving cone, said flange further including an extending metallic sleeve surrounding the outer portion of said stress-relieving cone, and an annular space formed between said metal sleeve and said stress-relieving cone, and further comprising an embedding material filling said annular space.

* * * * *